March 13, 1973     T. L. RACHEL     3,720,191

ACCELERATION ENRICHMENT CIRCUITRY FOR ELECTRONIC FUEL SYSTEM

Filed Jan. 25, 1971     3 Sheets-Sheet 1

WITNESS:

INVENTOR.
Todd L. Rachel
BY
Robert A. Benziger
ATTORNEY

March 13, 1973 T. L. RACHEL 3,720,191
ACCELERATION ENRICHMENT CIRCUITRY FOR ELECTRONIC FUEL SYSTEM
Filed Jan. 25, 1971 3 Sheets-Sheet 3

WITNESS:
Esther M. Stockton

INVENTOR.
Todd L. Rachel
BY
Robert A. Benziger
ATTORNEY

United States Patent Office 3,720,191
Patented Mar. 13, 1973

3,720,191
ACCELERATION ENRICHMENT CIRCUITRY FOR ELECTRONIC FUEL SYSTEM
Todd L. Rachel, Elmira, N.Y., assignor to The Bendix Corporation, Elmira, N.Y.
Filed Jan. 25, 1971, Ser. No. 109,277
Int. Cl. F02d 5/02
U.S. Cl. 123—32 EA                    11 Claims

ABSTRACT OF THE DISCLOSURE

A circuit is disclosed for generation of an output voltage signal having a characteristic which varies as the magnitude, and rate, of change of a setting of a remote control member. The present circuit is comprised of a signal receiving and processing circuit adapted to suitably vary a signal indicative of instantaneous control member setting, and an analog signal generating circuit responsive to the first-mentioned circuit for producing an output and voltage signal having an amplitude proportional to the magnitude, and rate, of change of the output of the processing circuit. A further circuit is provided to produce a single signal of fixed magnitude and variable duration suitable for controlling a single pulse circuit.

BACKGROUND OF THE PRESENT INVENTION

Field of the invention

The present invention relates generally to the field of electrical and electronic fuel control systems. More particularly, the present invention relates to that portion of the above-noted field concerned with fuel injection systems for automotive type internal combustion engines. Specifically, an improved acceleration enrichment circuit is provided for an electric fuel injection system adapted for automotive applications in which metered amounts of fuel are provided to one or more cylinders at a time.

Background of the invention

In order to provide the smooth operation which the automotive operator demands from his vehicle, it has been recognized that some form of acceleration enrichment must be provided so that vehicle will promptly respond to an instantaneous change in operational demands placed upon the engine. In those fuel systems in which injection of the various engine cylinders is accomplished by grouping those cylinders and injecting different groups in sequence, there exists a need for acceleration enrichment in view of the fact that there will be a specific time delay between the command to accelerate and the next injection pulse when the command would become effective. In those systems in which injection of the individual cylinders takes place in a sequential fashion, the need for acceleration enrichment is reduced but is, however, desirable so that the engine will demonstrate a smooth prompt response.

Present acceleration enrichment systems are quite adequent to accomplish the broad objectives of providing additional fuel to accomplish the acceleration enrichment function under the various operating conditions encountered. However, two areas of difficulty have been encountered with even the most sophisticated acceleration enrichment mechanism. The first of these occurs during the range of vehicle operation characterized as "light load," i.e., when the throttle is very slightly depressed. This is most often encountered when the vehicle is coming off of idle as for instance initial acceleration from a stop.. High engine and vehicle inertia combined with the maximum time period between successive injections make it necessary that the air/fuel ratio be proper from one injection to the next at low engine speeds. However, when the throttle is opened to accelerate the engine, the additional available quantities of air cause the air/fuel ratio to become leaner. With the current trend in vehicle operation towards fuel systems which operate on the lean side (i.e., where the air to fuel ratio is in excess of about 17 to 1) this additional leanness would be excessive and will cause noticeable misfiring which would increase exhaust emissions and which would be generally unacceptable to the typical vehicle operator since it would make operation of the vehicle, in a smooth and efficient manner, particularly the acceleration of the vehicle up to driving or cruising speeds, practically impossible. Secondly, even where misfiring does not occur, the increased leanness described above will cause the vehicle to lose power to the point that a command for acceleration will produce mometary deceleration short of misfiring.

In order to compensate for the above-noted defects, it is suggested to provide a means of signalling suitable electronic circuitry that an acceleration of the engine is desired prior to any increase in air delivery thereto. It is, therefore, an object of the present invention to provide electronic circuitry suitable for use in a system having "fuel-before air" acceleration capability. An additional problem with the present electronic circuits for providing acceleration enrichment is that they may be characterized as "on-off" circuits in that they either provide a full enrichment charge or none at all. Thus, an abrupt decrease in fuel delivery results at the end of each acceleration enrichment cycle noticeably altering the engine performance. It is, therefore, a still further object of the present invention to provide electrical circuitry suitable for use in an electronic fuel control system having "fuel-before air" capability in which the acceleration enrichment signal produces fuel enrichment increments, which may change in a continuously variable fashion following initiation so that fuel delivery as a result of the acceleration enrichment signal may vary to more closely fit the fuel requirement and may gradually decrease. It is a still further object of the present invention to provide an acceleration enrichment circuit producing an output signal whose effect gradually decreases from a maximum to zero.

In those electronic fuel control systems for internal combustion engines which control fuel delivery to the combustion cylinders thereof by energizing multiple member groups of injector valve means, it is a further object of the present invention to further produce an "on-off" signal at the occurrence of an acceleration command for application to circuitry adapted to momentarily reenergize the most recently-energized injection valve means groups to augment the fuel charge of those combustion cylinders to be fired next in succession to thereby avoid the above-noted delay in acceleration.

SUMMARY OF THE PRESENT INVENTION

The present invention comprises electronic circuitry having sub-circuits performing discrete sub-functions. The first The present invention comprises electronic circuitry having sub-circuit is adapted to receive, suitably amplify, and transfer a signal indicative of instantaneous control member setting. The second sub-circuit is responsive to changes in the output of the first sub-circuit and produces in response thereto an output signal having a magnitude which is a function of the magnitude, and rate, of such changes and which then decreases in a selected fashion. The present invention is characterized in a preferred embodiment by providing a capacitor in the base circuit of a transistor amplifier having its base and emitter resistively coupled to establish a normal transistor "off" (nonconducting) configuration and by then coupling the emitter to a selected portion of a main computing circuit so that transistor conduction can be selectively triggered through the base circuit to alter the voltage potential within the main computing circuit at the selected location. Additionally, the present invention contemplates the addition of a third sub-circuit responsive to changes in the output of the first sub-circuit having a magnitude and rate of change in excess of a selected value operative to produce an output pulse usable as a signal for a demand for acceleration. In the presently preferred embodiment, which contemplates application to a group injection electronic fuel system, this signal in operative to initiate appropriate additional circuitry to re-energize the most recently activated group of injector valve means to provide an additional increment of fuel for acceleration purposes to those combustion cylinders of the group yet to ingest their fuel change.

DETAILED DESCRIPTION OF THE DRAWINGS

Figure 1:
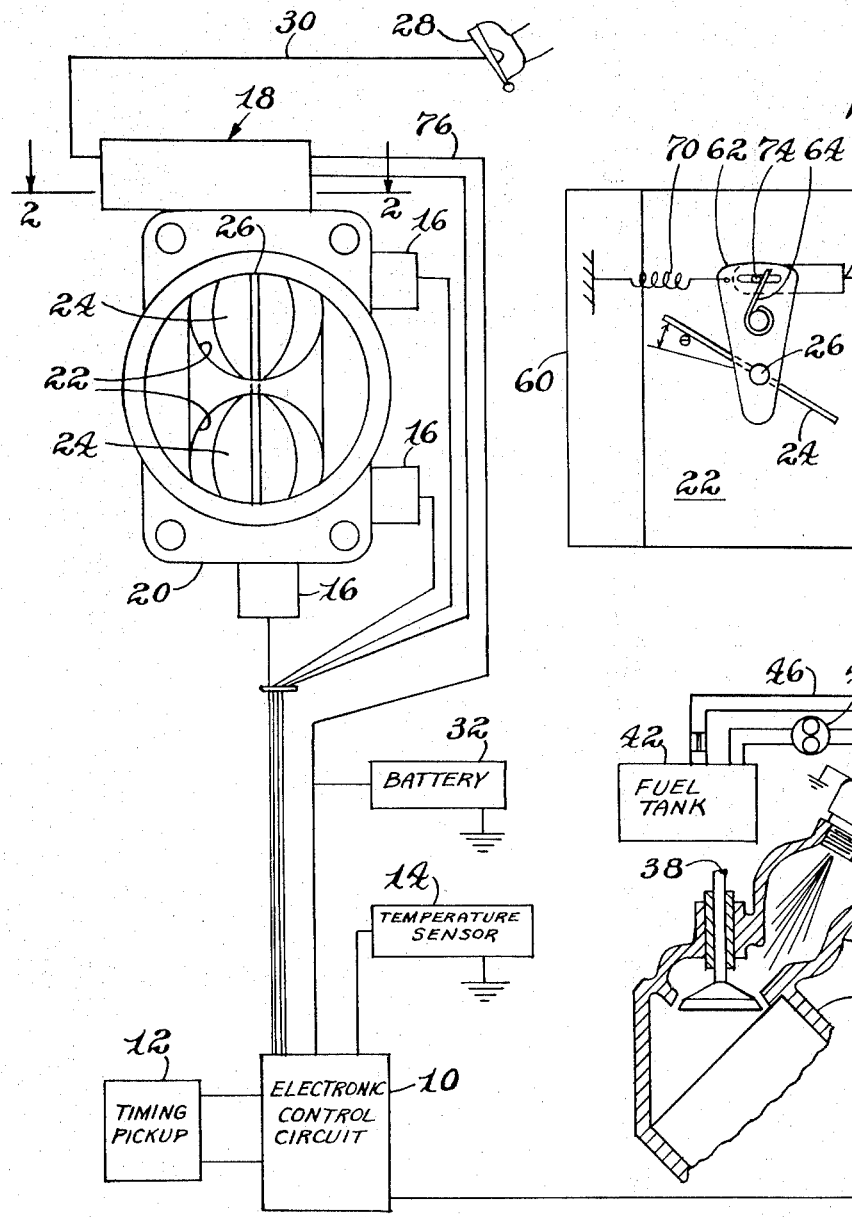
FIG. 1 shows a schematic diagram of a fuel system having electronic control adapted to control delivery of an air/fuel mixture to the combustion chambers of an internal combustion engine.

Referring now to FIG. 1, an electronic fuel control system is shown which may utilize the present invention. The system is comprised of an electronic control unit 10 which receives signals from a timing pick-up 12, a temperature sensor 14, various parameters sensors 16 associated with a throttle body, and signals from the acceleration enrichment signalling mechanism 18. Parameter sensors 16 and acceleration enrichment signalling mechanism 18 are attached to throttle body 20 which controls the flow of air into the engine. Throttle body 20 has a pair of air passages passing therethrough indicated as 22 and the effective cross-sectional area of passages 22 is controlled by throttle plates 24. Throttle plates 24 are mounted on shaft 26 for controlled rotation therewith. The angular position of shaft 26 and hence of throttle plates 24 is controlled by throttle control means comprised of actuating means in the form of pedal 28 and suitable connecting linkage 30 through the intermediary of acceleration enrichment signalling mechanism 18.

The electronic control unit 10 is energized by battery 32 which also energizes those of the various sensors which require external energization. The output of the electronic control unit 10 is used to control the energization of an injector valve means 34 which is mounted in the intake manifold 36 and which is adapted to introduce an air/fuel mixture for intake through intake valve 38, shown in an open position, into the combustion cylinder 40 of the internal combustion engine. Fuel is provided to injector valve means 34 from fuel tank 42 by means of pump 44 and suitable fuel supply and return lines 46.

Figure 2:
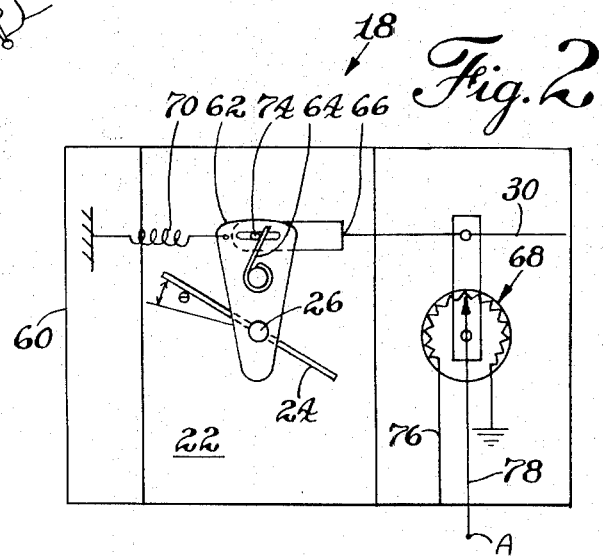
FIG. 2 shows an illustrative schematic of one form of the acceleration enrichment signalling mechanism of utility with the present invention taken along the line 2—2 of FIG. 1.

Referring now to FIG. 2, the acceleration enrichment mechanism 18 of FIG. 1 is shown in an illustrative schematic form. Mechanism 18 as illustrated herein is the input generator for the present invention and is intended to be illustrative of a mechanism for providing a "fuel-before air" acceleration enrichment signal. However, the present invention is not limited to such an input generating mechanism. Mechanism 18 comprises a housing member 60, lost motion link 62, resilient biasing means 64, position control means 66, signal generator 68, in the form of a potentiometer, in this instance, and closing means 70. Lost motion link 62 is fixedly attached to the throttle plate shaft 26 to control rotation thereof. Lost motion link 62 includes a travel slot 72 and position control means 66 includes a pin member 74 mounted for movement in the travel slot 72. Resilient means 64 are operative to urge the pin member 74 to an extreme end of slot 72 while position control means 66 are operative to urge the pin towards the other extreme end of slot 72. Closing means 70 are operative to urge the lost motion link and, hence, the throttle plates 24, counterclockwise relative to the drawing of FIG. 2 to effect closing movement thereof upon release of tension in control means 66. Signal generating means 68 is powered by lead 76 from battery 32 and is operative to produce an output signal on signal lead 78 which is indicative of the instantaneous position of position control means 66. Lead 78 terminates in electrical point A and the output signal appearing thereat will be more discussed hereinbelow. Alphabetic designations are used herein to denote circuit points which are, or may be made, common to two or more figures of the drawing. A linear potentiometer 68 having its slider connected to position control means 66 has been selected as illustrative of ways to provide this signal. The potentiometer 68 receives a voltage input on lead 76 from the battery 32 as shown in FIG. 1 and the voltage on lead 78 is therefore directly related to the position of the position control means 66.

In operation, with the throttle plate at any angular position indicative of the engine operating situation, the application of pressure to throttle pedal 28 will cause, through the suitable linkage 30, a rightward (relative to FIG. 2) movement of position control means 66. This movement will change the instantaneous voltage appearing on lead 78 and, in this embodiment, will cause the voltage to decrease. However, the initial movement of the position control means 66 will cause pin 74 to move rightward within slot 72 against the bias of resilient means 64 prior to any movement of the throttle plates 24. This can readily be arranged by insuring that the initial increment of movement of resilient means 64 requires less force than does movement of the lost motion link 62 against the bias of closing means 70 and any friction present in the mounting of shaft 26. Thus, the voltage on lead 78 will change indicating a desire for acceleration prior to any movement of the throttle plate 24.

Figure 3:
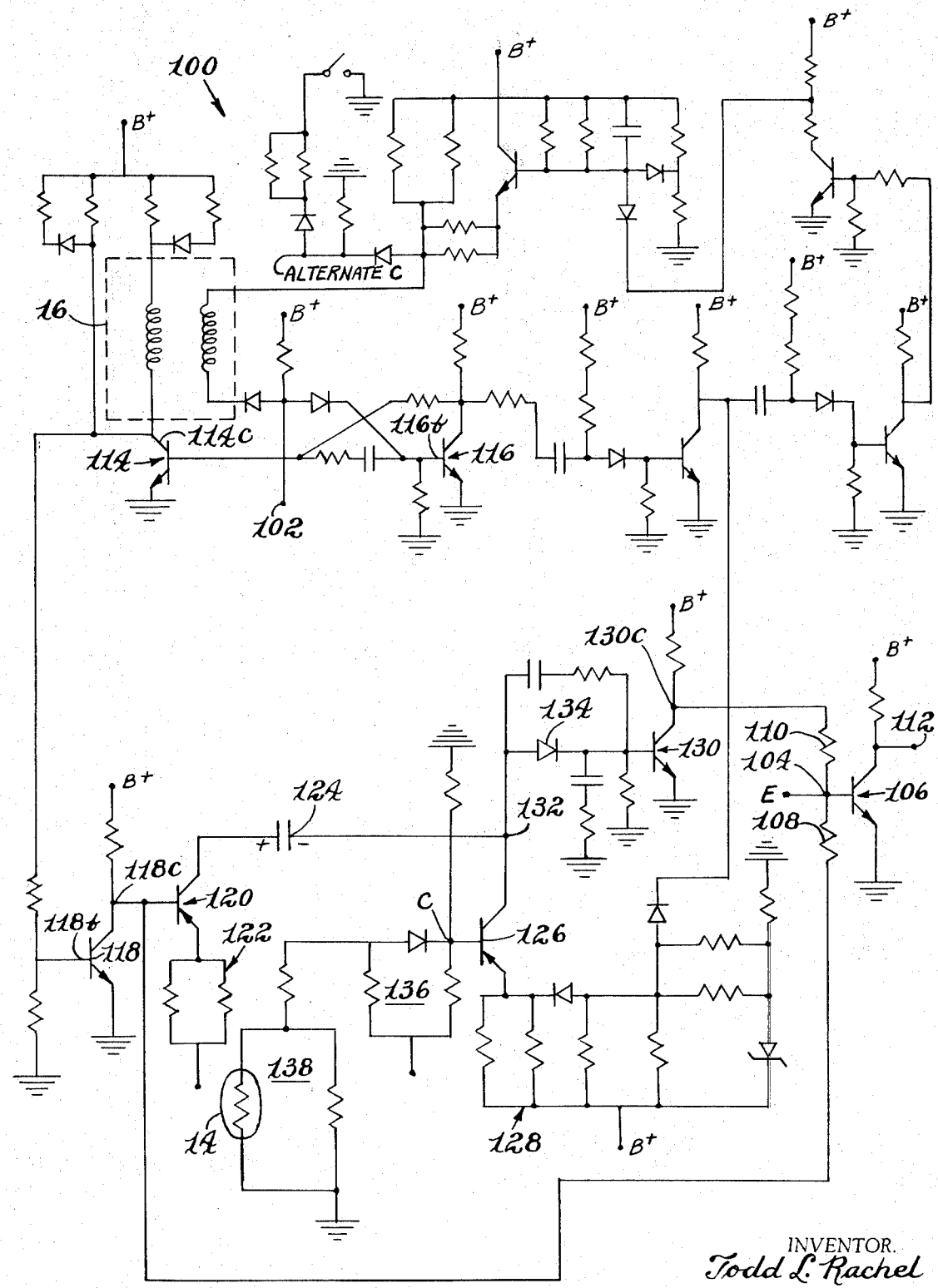
FIG. 3 shows an electronic schematic diagram of a main computing circuit with which the present invention is of utility.

Referring now to FIG. 3, the main computing means of the electronic control unit 10 is illustrated. This circuit is shown as being energized by a voltage supply designated by B+ at the various locations noted. In the application of this system to an automotive fuel control system, the voltage supply could be the battery and/or battery charging system conventionally used as the vehicle's electric power source. The man skilled in the art will recognize that the electrical polarity of the voltage supply, shown in FIG. 1 as battery 32, could be readily reversed.

The circuit 100 receives along with the voltage supply, various voltage signal sensory inputs indicative of various operating parameters of the associated engine. Intake manifold pressure sensor 116 (which may be one of the sensors 16 shown in FIG. 1) supplies a voltage indicative of manifold pressure, temperature sensor 14 is operative to vary the voltage across the parallel resistance to provide a voltage signal indicative of engine temperature and voltage signals indicative of engine speed are received at circuit port 102 from the timing pick-up 12. This signal may be derived from any source indicative of engine crank angle but is preferably from the engine's ignition distributor.

The circuit 100 is operative to provide two consecutive pulses of variable duration, through sequential networks to circuit location 104 to thereby control the "on" time of transistor 106. The first pulse is provided via resistor 108 from that portion of circuit 100 having inputs indicative of engine crank angle and intake manifold pressure. Termination of this pulse initiates a second pulse which is provided via resistor 110 from that portion of the circuit 100 having an input from the temperature sensor 14. These pulses, received sequentially at circuit location 104, serve to turn transistor 106 "on" (that is, transistor 106 is triggered into the conduction state) and a relatively low voltage signal is present at circuit output port 112. This port may be connected, through suitable inverters and/or amplifiers (not shown) to the injector means (shown as 34 in FIG. 1) such that the injector means are energized and thus open whenever the transistor 106 is turned "on." Because the injector valve means are relatively slow acting, compared with the speed of electronic devices, these successive pulses at circuit location 104 will result in the injector valve means remaining open until after the termination of the second pulse.

The duration of the first pulse is controlled by the monostable multivibrator network associated with transistors 114 and 116. The presence of a pulse received via input port 102 will trigger the multivibrator into its unstable state with transistor 114 in the conducting state and transistor 116 blocked (or in the nonconducting state). The period of time during which transistor 114 is conducting will be controlled by the voltage signal from manifold pressure sensor 16. Conduction of transistor 114 will cause the collector 114c thereof to assume a relatively low voltage close to the ground or common voltage. This low voltage will cause the base 118b of transistor 118 to assume a low voltage below that required for transistor 118 to be triggered into the conduction state thus causing transistor 118 to be turned "off." The voltage at the collector 118c will, therefore, rise towards the B+ value and will be communicated via resistor 108 to circuit location 104 where it will trigger transistor 106 into the "on" or conduction state, thus imposing a relatively low voltage at circuit port 112. As hereinbefore stated, the presence of a low voltage signal at circuit port 112 will cause the selected injector valve means to open and remain open. When the voltage from the manifold pressure sensor 16 has decayed to the value necessary for the multivibrator to relax or return to its stable condition, transistor 116 will be triggered "on" and transistor 114 will be turned "off." This will, in turn, cause transistor 118 to turn "on," transistor 106 to turn "off" and thereby remove the injector control signal from circuit port 112.

During the time that transistor 118 has been held in the nonconducting or "off" state the relatively high voltage at collector 118c has been applied to the base of transistor 120, triggering the transistor 120 "on." The resistor network 122, connected to the voltage supply, acts with transistor 120 as a current source and current flows through the conducting transistor 120 and begins to charge capacitor 124. Simultaneously, transistor 126 has been biased "on" and, with the resistor network 128, constitutes a second current source. Current from both sources flows into the base of transistor 130 thereby holding this transistor "on" which results in a low voltage at the collector 130c. This low voltage is communicated to the base of transistor 106 via resistor 110.

When transistor 114 turns "off" signalling termination of the first pulse, transistor 118 turns "on" and the potential at the collector 118c falls to a low value. The current from the current source comprised of transistor 120 and resistor network 122 now flows through the base of transistor 120 and the capacitor 124 ceases to charge. The capacitor will then have been charged with the polarity shown in FIG. 3 to a value representative of the duration of the first pulse. However, the potential at the collector of transistor 120 will be only slightly positive with respect to ground since only several pn junctions separate it from ground. This will impose a negative voltage on circuit location 132 which will reverse bias diode 134 and transistor 130 will be turned "off." This will initiate a high voltage signal from the collector of transistor 130 to circuit location 104 via resistor 110 which signal will retrigger transistor 106 "on" and the second injector means control pulse will appear at circuit port 112. The time duration between first and second pulses will be sufficiently short so that the injector means will not respond to the brief lack of signal.

While the diode 134 is reversed biased, the current from the current source comprised of transistor 126 and resistor network 128 will be flowing through circuit location 132 and into the capacitor 124 to charge the capacitor to the point that circuit location 132 will again be positively biased with respect to ground. This will then forward bias diode 134 and transistor 130 will turn back "on." This will terminate the second pulse and the injector valve means will subsequently close.

The duration of the second pulse will be a function of the time required for circuit location 132 to become sufficiently positive for diode 134 to be forward biased. This, in turn, is a function of the charge on capacitor 124 and the magnitude of the charging current supplied by the current source comprised of transistor 126 and resistor network 128. The charge on capacitor 124 is, of course, a function of the duration of the first pulse. However, the rate of charge (i.e., magnitude of the charging current) is a function of the base voltage at transistor 126. This value is controlled by the voltage divider networks 136 and 138 with the effect of network 138 being variably controlled by the engine temperature sensor 14.

The circuit of FIG. 3 contains three locations denoted by alphabetic designations. These are circuit points C, Alternate C and E. Points E and C are at the bases of transistors 106 and 126 respectively and point Alternate C is located within the network which establishes the voltage level applied to inductive pressure sensor 16.

Figure 4:
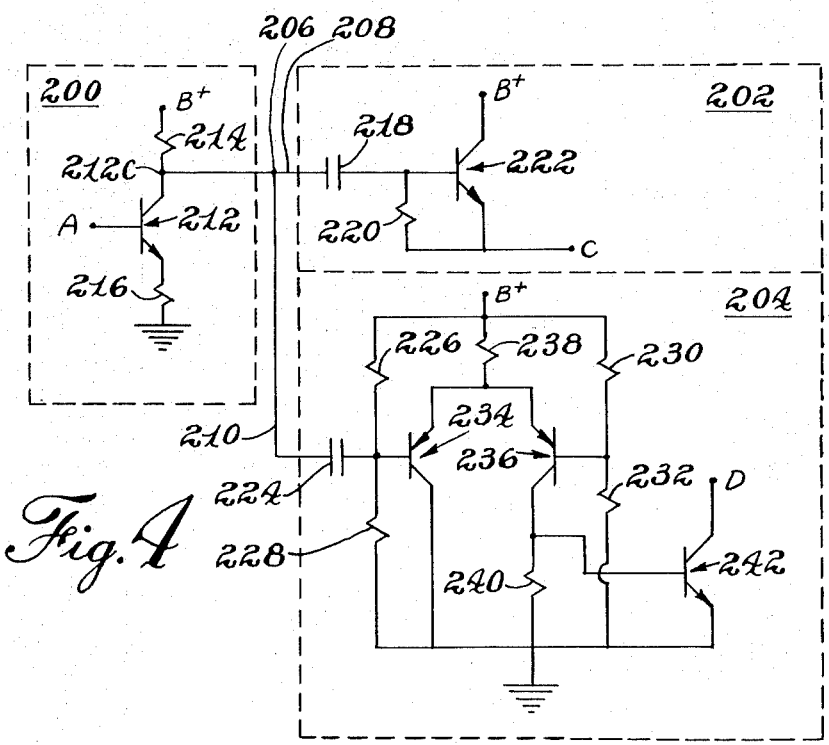
FIG. 4 shows an electronic circuit schematic of the acceleration enrichment circuit of the present invention adapted to interface between the mechanism of FIG. 2 and the circuits of FIGS. 3 and 5.

Referring now to FIG. 4, the inventive circuit will be described with additional reefrence to FIGS. 3 and 5. The circuit of FIG. 4 comprises an amplifier portion 200, an analog signal generating portion 202 and a controlled switch portion 204. The amplifier portion 200 is energized by B+ as noted and receives a signal from the acceleration enrichment signalling mechanism 18 (of FIG. 1) through signal input port point A. An output signal from amplifier portion 200 is coupled to analog signal generating portion 202 and controlled switching portion 204 from circuit location 206 via leads 208 and 210. Analog signal generating portion 202 is operative to provide an analog voltage signal at circuit point C for a period of time following receipt of an input signal. Controlled signal portion 204 is operative to provide a switched output signal of variable duration at circuit point D following receipt of an input signal.

Amplifier portion 200 is comprised of transistor 212 and resistors 214 and 216. This circuit is arranged as a common-emitter amplifier with resistor 214 being the load resistor and is used to amplify and shape the instantaneous control means setting signal. Thus, the voltage at the collector terminal 212c of transistor 212 will increase as the voltage at the base of the transistor (in this instance, the voltage output of the potentiometer output lead 78 and point A) decreases. Therefore, the collector terminal voltage will represent the instantaneous position control means setting. The gain of this amplifier configuration is the ratio of the resistance of resistor 214 to that of resistor 216. By proper selection of resistive values, the switching control circuit 200, and thus the circuits 202 and 204 can be made as sensitive or insensitive to slight throttle movements as desired.

Analog signal generating circuit 202 is comprised of capacitor 218, resistor 220, and transistor 222. The capacitor 218 interconnects the base of transistor 222 to the output of switching control circuit 200 and the resistor 220 interconnects the base of transistor 222 and the emitter of the transistor 222 and provides that, under steady state conditions, transistor 222 will be switching off.

The emitter of transistor 222 is connected to point C. Point C may be connected to either circuit point C or Alternate C (in FIG. 3) and, under steady state conditions will be an electrical potential determined by the circuit potential to which point C is connected and the amount of conduction of transistor 222.

Under steady state conditions, capacitor 218 will behave as an open circuit and resistor 220 will maintain the voltage at the base of the transistor 222 at or blelow the voltage at the emitter of the transistor 222. If the voltage at circuit location suddenly rises (due to a change in the base voltage indicative of an acceleration demand) the voltage at the base of transistor 222 will rise by a predeterminable amount and transistor 222 will begin to conduct. The amounts of conduction will be determined by the base voltage of transistor 222 and this will be determined as a function of the voltage at circuit location 206 due to the capacitive coupling and also as a function of the time period over which the voltage increased since the capacitor 218 will immediately begin to charge (or discharge) to a new steady state level.

The output signal from amplifier portion 200 is also provided to controlled switch 204. This circuit 204 is comprised of a capacitor 224, a bias network comprised of resistors 226, 228, 230 and 232, an emitter-coupled pair of transistors 234 and 236, resistors 238 and 240 and switching transistor 242. The bias network of resistors 226, 228, 230 and 232 is arranged so that the potential at the base of transistor 236 exceeds the potential at the base of transistor 234 (with respect to the ground or common potential) therefore biasing transistor 234 on and turning transistor 236 off. The base of transistor 242 is connected to the collector of transistor 236 so that the electrical state of transistor 242 will coincide with the state of transistor 236. The collector of transistor 242 is connected to circuit point D and the potential at D will be determined by the resistance of resistors 304, 306 whenever transistor 242 is off and will be at the ground or common potential whenever transistor 242 is on.

The capacitor 224 functions as an open circuit under steady state conditions and responds to voltage changes at circuit location 206 in the same manner as does capacitor 218. The emitter-coupled pair of transistors 234, 236 is arranged to respond only to voltage changes at circuit location 206 which are sufficiently great that the capacitive coupling between circuit location 206 and the base of transistor 234 will raise the base voltage above the voltage at the base of transistor 236 established by the voltage divider effect of resistors 230 and 232. Since the capacitor 224 will begin to charge (or discharge) immediately upon a voltage change at circuit location 206, the magnitude of that voltage change and the rate of that change will influence circuit 204. That is, if the magnitude of the change is small or if the rate of the change is low, the voltage at the base of transistor 234 may not change sufficiently for it to turn off and thereby cause transistors 236 and 242 to turn on.

Figure 5:
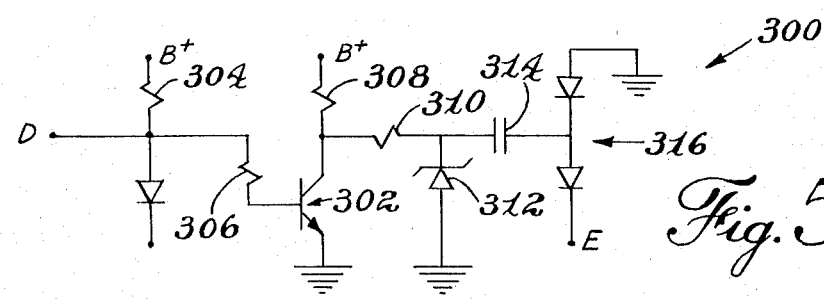
FIG. 5 shows an acceleration enrichment circuit useful with the present invention.

Referring now to FIG. 5, a circuit 300 is shown. Circuit 300 is adapted to generate a single pulse of fixed duration for application to a selected remote location which may be, for instance, the injector valve means most recently energized. Circuit 300 is comprised of normally conducting transistor 302, bias establishing resistors 304 and 306, load resistors 308 and 310, Zener diode 312, capacitor 314 and diode means 316.

Operation

Referring now to the circuit of FIG. 4 in conjunction with the circuits of FIGS. 3 and 5, the mechanism of FIGS. 1 and 2 and the voltage waveforms of FIG. 6, the operation of the present invention will be described. An initial state of vehicle operation at a steady throttle setting will be presumed. Depression of throttle 28 at time T will cause an instantaneous movement of linkage 30 which will cause the setting of potentiometer 68 to change. Therefore, the voltage picked off by lead 78 and appearing at circuit point A will decrease. This initial movement will have the effect of stressing spring 64 so that the position of throttle plate 24 will initially be unchanged. The decrease in voltage signal received at the base of transistor 212 will cause the voltage at the collector thereof to increase by an amount representative of the change in voltage at circuit point A multiplied by the gain factor of the amplifier configuration. Thus, the voltage at circuit location 206 will rise. The effect of this increase in voltage will be applied via leads 208 and 210 to the analog signal generating circuit 202 and the controlled switch circuit 204.

This voltage change will be applied to capacitor 218 in the analog signal generating circuit. Since the voltage appearing across a capacitor cannot change instantaneously, the voltage being applied to the base of transistor 222 will also increase. This will have the effect of increasing the conductivity of transistor 222 and will cause the voltage at the emitter of that transistor to increase so that the voltage at circuit point C, illustrated as $V_c$ in FIG. 6 will also increase. This voltage may be applied to either of the locations noted in FIG. 3 as circuit points C and Alternate C. The effect of this voltage change will be to vary the established voltage levels in FIG. 3 so that the pulse length of the pulses established by that circuit, illustrated as $V_{112}$ in FIG. 6, will be increased by an amount proportional to the voltage change at circuit point C. This change in voltage will be a function of the amount of change in the desired throttle control setting, i.e., the change in voltage at circuit point A and will also be a function of the speed with which the throttle position has been changed since the charge on the capacitor will begin to change immediately. Thus, the magnitude of the effect produced on the circuit 100 will be in proportion to the magnitude of the change in throttle position as well as the speed with which that change was made. When a new steady state position is established for the throttle setting, the voltage at circuit location 206 will be established at some new steady value and the charge on capacitor 218 will adjust to this new value. The rate of charge of the capacitor 218 will be a function of the RC time constant of the circuit 202 and will, therefore, control the amount of voltage change realized within circuit 100 and hence, the magnitude and duration of the effect imposed on circuit 100 by analog signal generating circuit 202. The result of this will be a lengthening of one or both of the injection command pulses appearing at circuit port 112 (of FIG. 1). The amount of pulse duration increase will thereafter shorten as a function of the RC time constant of circuit 202 and the voltage at circuit location 206 (i.e., as a function of the total change and speed of change of throttle control setting). This circuit 202 will therefore provide for additional fuel for acceleration in an amount which varies approximately as engine need for enrichment varies.

The change in throttle position and, hence, the voltage at circuit location 206 will also be experienced by capacitor 224. This will have the effect of increasing the voltage at the base of transistor 234. If the throttle position change is of sufficient magnitude, the voltage at the base of transistor 234 will rise above that at the base of transistor 236 and, due to the emitter-coupled pair configuration, transistor 234 will be turned "off" and transistor 236 will be turned "on." Conduction of transistor 236 will cause current to flow through resistor 240 so that a voltage drop is experienced thereacross. This voltage difference will be applied to the emitter-base junction of transistor 242 causing that transistor to begin to conduct so that a ground or common potential signal will be experienced at circuit point D. Circuit point D is connected to the input point D of circuit 300 in FIG. 5 and the presence of this ground potential will terminate current flow through resistor 206 so as to cause transistor 302 to be turned "off." This will cause the voltage applied to capacitor 314 to increase rapidly and this increase will be applied by way of the diode means 316 to circuit point E. Circuit point E is connected directly to control transistor 106 (of FIG. 3) so that the presence of a signal at point E will cause transistor 106 to go into conduction, and an output signal will be realized at circuit port 112. This signal will directly control the energization of the injector valve means 34 currently electrically coupled to circuit port 112 (of FIG. 3). The magnitude of this signal will be a function of the time required to discharge capacitor 314 to the proper level and may, therefore, be established as a constant value.

Figure 6:
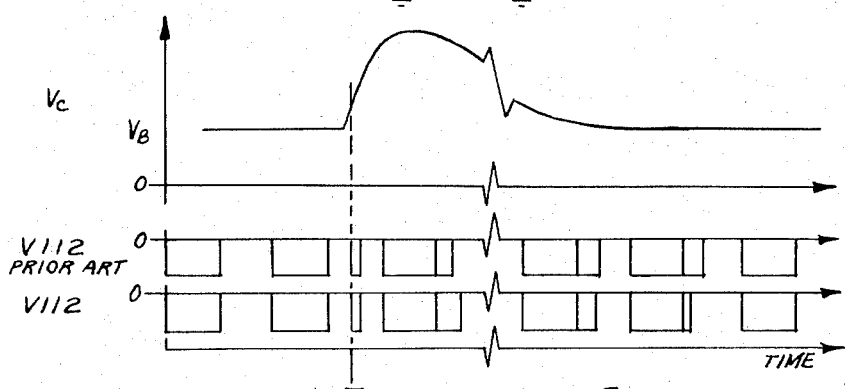
FIG. 6 shows a waveform diagram of various voltages present within the circuit of FIG. 3 and the cricuit of FIG. 4 and a prior art comparison voltage waveform.

FIG. 6 illustrates three voltage waveforms plotted as a function of time and representative of two selected voltages within the circuit of FIG. 4 ($V_c$) and FIG. 3 ($V_{112}$) and of a prior art voltage value of the FIG. 3 waveform. Assuming a command for acceleration at time T, the voltage at circuit point C will rise from its steady state value to a higher value dependent upon the magnitude, and rate, of change of the throttle setting. It will then decay following the normal RC time constant decay curve back to its steady state value. At the instant of voltage drop, time T, a short pulse will appear at circuit port 112 (of FIG. 3) as a result of the action of circuits 200 and 204 (of FIG. 4) and 300 (of FIG. 5). Each regularly generated injector command pulse normally appearing at circuit port 112 thereafter for a determinable time period will have added thereto an incremental pulse representative of the fuel enrichment for acceleration. As shown in the plot $V_{112}$ (prior art) these additional increments were, according to the teaching of the prior art, of uniform length wave shape until terminated. However, the additional increments according to the present invention will have a duration proportional to the difference in the voltage $V_c$ from its steady state value. They will thus contribute to the fuel metering pulse an amount more closely matching the enrichment requirement and will automatically decrease as the enrichment requirement decreases.

It will be apparent to the man of ordinary skill in the art that my invention may be realized in circuit configurations which utilize all n-p-n or all p-n-p transistors or mixtures thereof which differ from the combination which I have utilized. Furthermore, the supply (B+) could also be negative with respect to the ground or common potential and additional amplifier and/or inverter stages could be used without departing from my invention.

I claim:

1. In combination with a fuel control system for an internal combustion engine having a throttle valve controlled air intake manifold, the fuel control system having electrically energizable input transducer means operatively associated with the engine and electrically coupled to an electrical computing means operative to apply certain engine parameter indicative signals, exclusive of acceleration, to the electrical computing means, the electrical computing means operative to generate a fuel control signal for intermittently energizing at least one fuel injector valve means and responsive to variations in the engine parameter signal to vary the fuel control signal whereby the quantity of fuel delivered to the engine by the fuel injector valve means may be varied, the improvement comprising:
   signalling means cooperatively associated with the throttle valve, operative to generate a signal indicative of the throttle valve position;
   analog circuit means responsive to said throttle position signalling means operative to generate an output signal having a magnitude which is a function of the magnitude, and rate, of change of the throttle position signalling means signal; and
   means for applying said analog circuit means signal to at least one transducer means to controllably alter this transducer means energization whereby the engine parameter indicative signal will be altered for a period of time dependent upon the magnitude, and rate, of change of the throttle position signalling means signal.

2. The system as claimed in claim 1 including further switching means coupled to said throttle position signalling means and communicating with said analog circuit means operative to amplify and shape said throttle position signalling means signal whereby the analog circuit means may be made nonresponsive to throttle position changes less than a predetermined value.

3. The system as claimed in claim 2 wherein said analog circuit means comprise a capacitor having two leads with one lead connected to the output of said switching control circuit means and having an electronic amplifier connected to the other lead.

4. The system as claimed in claim 3 wherein said electronic amplifier is a transistor amplifier having its control electrode coupled to said capacitor and having its output electrode resistively coupled to its input electrode.

5. The system as claimed in claim 2 including further controlled switching circuit means responsive to a change in the switching control circuit means to generate a signal pulse, and single pulse circuit means responsive to said signal pulse operative to produce an output pulse of predetermined magnitude and duration for receipt by the computing means whereby an additional injection pulse may be produced.

6. A fuel system for an internal combustion engine having an intake manifold with a variably positionable air flow controlling valve disposed therein comprising:
   fuel delivery means, including nozzle means, for providing metered quantities of fuel to the engine;
   sensor means for cooperative association with the engine operative to generate at least one electrical signal indicative of the engine operating conditions;
   computing means responsive to said sensor means operative to generate at least one signal for controlling said nozzle means whereby the fuel delivered to the engine may be metered;
   said computing means comprising electronic circuitry having at least one circuit location electrically coupled to said sensor means to receive the sensor means signal, said circuit location responsive to variations in the magnitude of the signal from the sensor means operative to controllably vary the computing means signal whereby the fuel delivery may be varied;
   position sensing means for cooperative association with the air flow controlling valve operative to generate an electrical signal indicative of the position of the valve; and
   acceleration enrichment circuitry responsive to changes in the valve position operative to generate a signal indicative of the magnitude, and rate, of change of the valve position and including means for communicating the acceleration enrichment signal to said computing means circuit location, said acceleration enrichment signal operative during the time that its magnitude exceeds the magnitude of the sensor means signal to override the sensor means signal.

7. The system as claimed in claim 6 including further switching control circuit means responsive to a signal proportional to an instantaneous control setting operative to amplify and shape said signal for receipt by said analog circuit means.

8. The system as claimed in claim 7 wherein said switching control circuit means comprise an electronic amplifier.

9. The system as claimed in claim 7 wherein said analog circuit means comprise a capacitor having two leads with one lead connected to the output of said switching control circuit means and having an electronic amplifier connected to the other lead.

10. The system as claimed in claim 9 wherein said electronic amplifier is a transistor amplifier having its control electrode coupled to said capacitor and having its output electrode resistively coupled to its input electrode.

11. The system as claimed in claim 7 including further controlled switching circuit means responsive to a change in the switching control circuit means to generate a signal pulse, and single pulse circuit means responsive to said signal pulse operative to produce an output pulse of predetermined magnitude and duration for receipt by the computing means whereby an additional injection pulse may be produced.

References Cited

UNITED STATES PATENTS

| | | | |
|---|---|---|---|
| 3,548,791 | 12/1970 | Long | 123—32 EA |
| 3,593,692 | 7/1971 | Scholl | 123—32 EA |
| 3,272,187 | 9/1966 | Westbrook et al. | 123—32 EA |
| 3,581,723 | 6/1971 | Scholl | 123—32 EA |

LAURENCE M. GOODRIDGE, Primary Examiner

U.S. Cl. X.R.

123—139 BG